Nov. 27, 1923.
R. H. HASSLER
1,475,384
VEHICLE SHOCK ABSORBING SYSTEM
Filed July 3, 1923   5 Sheets-Sheet 2
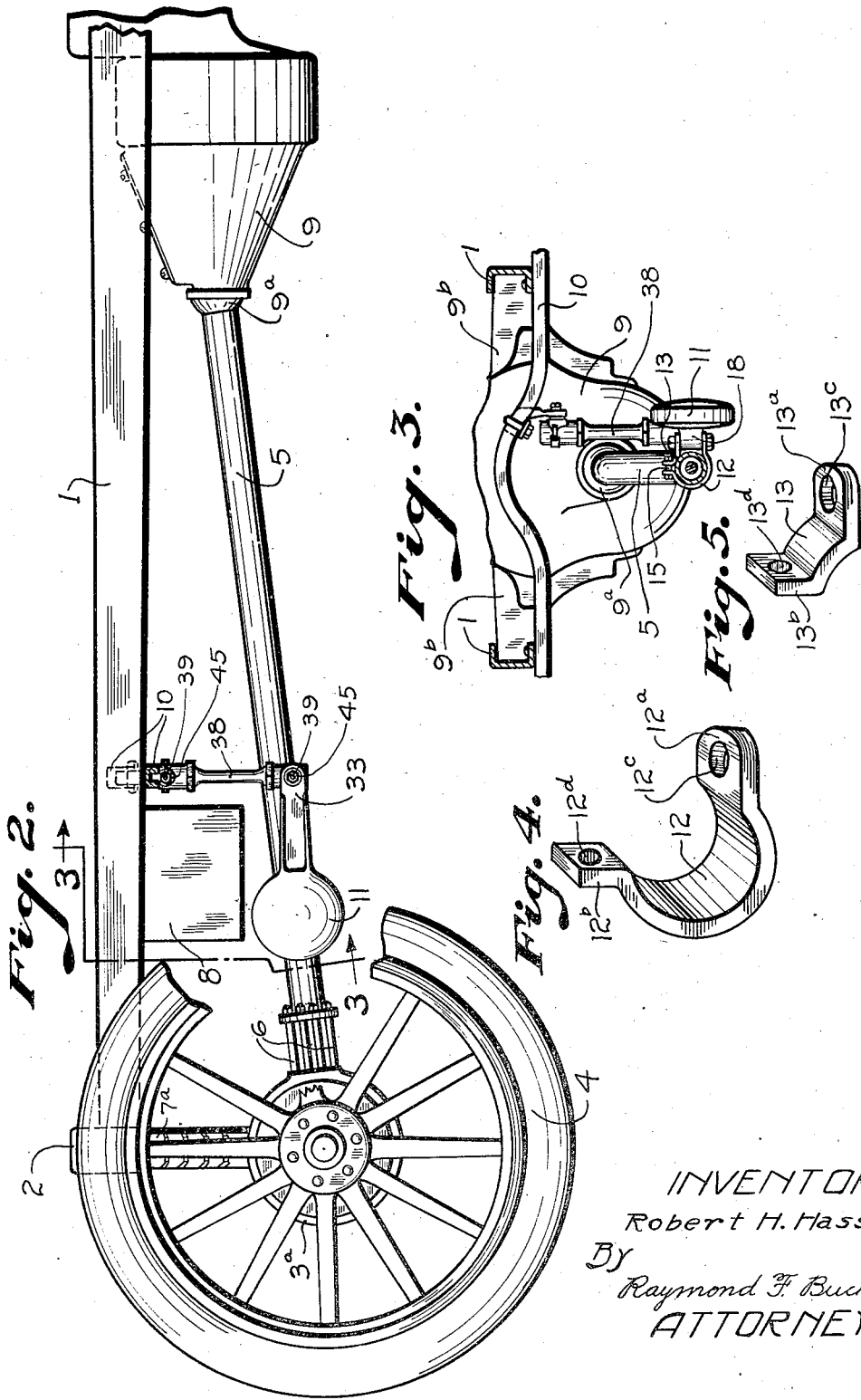
INVENTOR
Robert H. Hassler.
By
Raymond F. Buckley
ATTORNEY Nov. 27, 1923.
R. H. HASSLER
1,475,384
VEHICLE SHOCK ABSORBING SYSTEM
Filed July 3, 1923   5 Sheets-Sheet 3
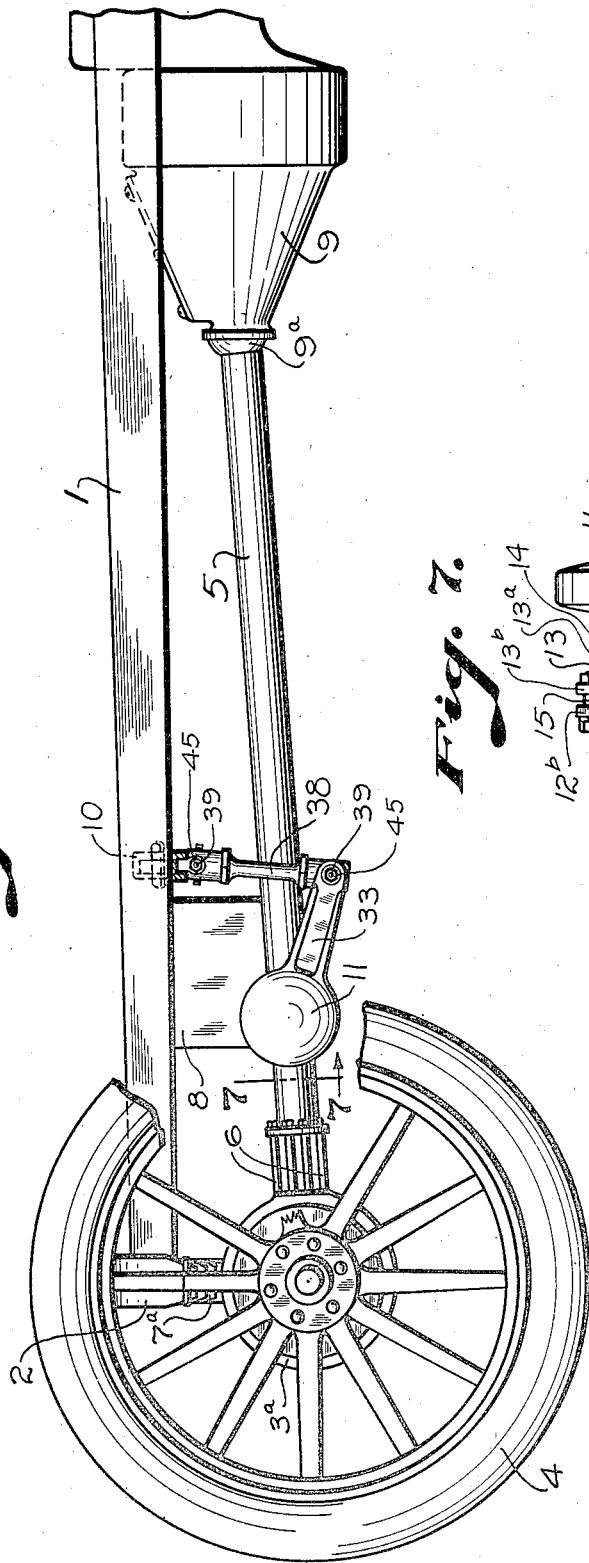
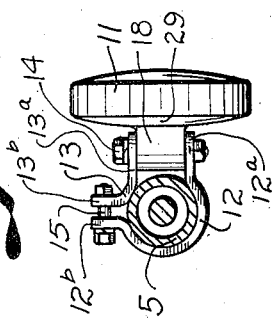
INVENTOR
Robert H. Hassler.
BY Raymond F. Buckley.
ATTORNEY Nov. 27, 1923.                                               1,475,384
R. H. HASSLER
VEHICLE SHOCK ABSORBING SYSTEM
Filed July 3, 1923           5 Sheets-Sheet 4
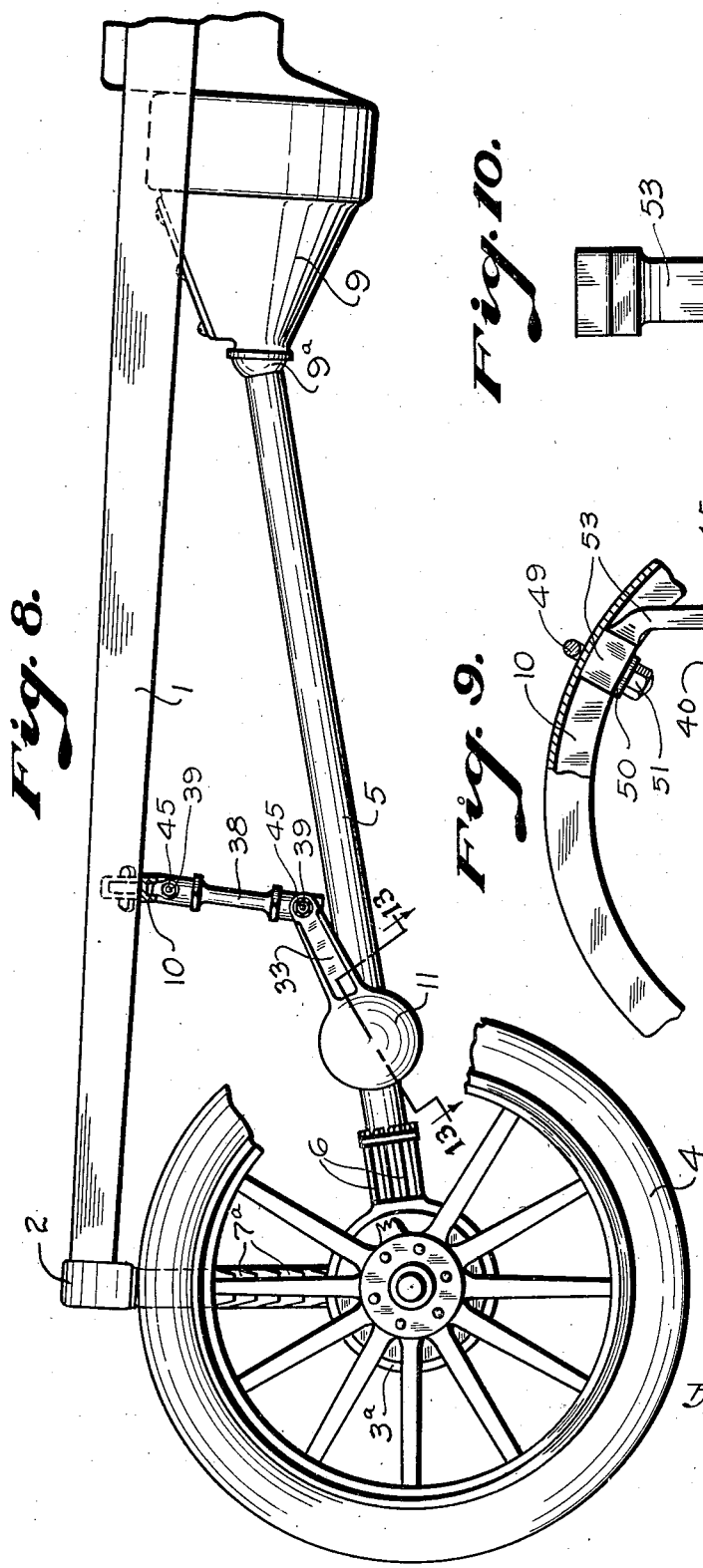
INVENTOR
Robert H. Hassler.
By Raymond F. Buckley.
ATTORNEY Nov. 27, 1923.
R. H. HASSLER
1,475,384
VEHICLE SHOCK ABSORBING SYSTEM
Filed July 3, 1923   5 Sheets-Sheet 5
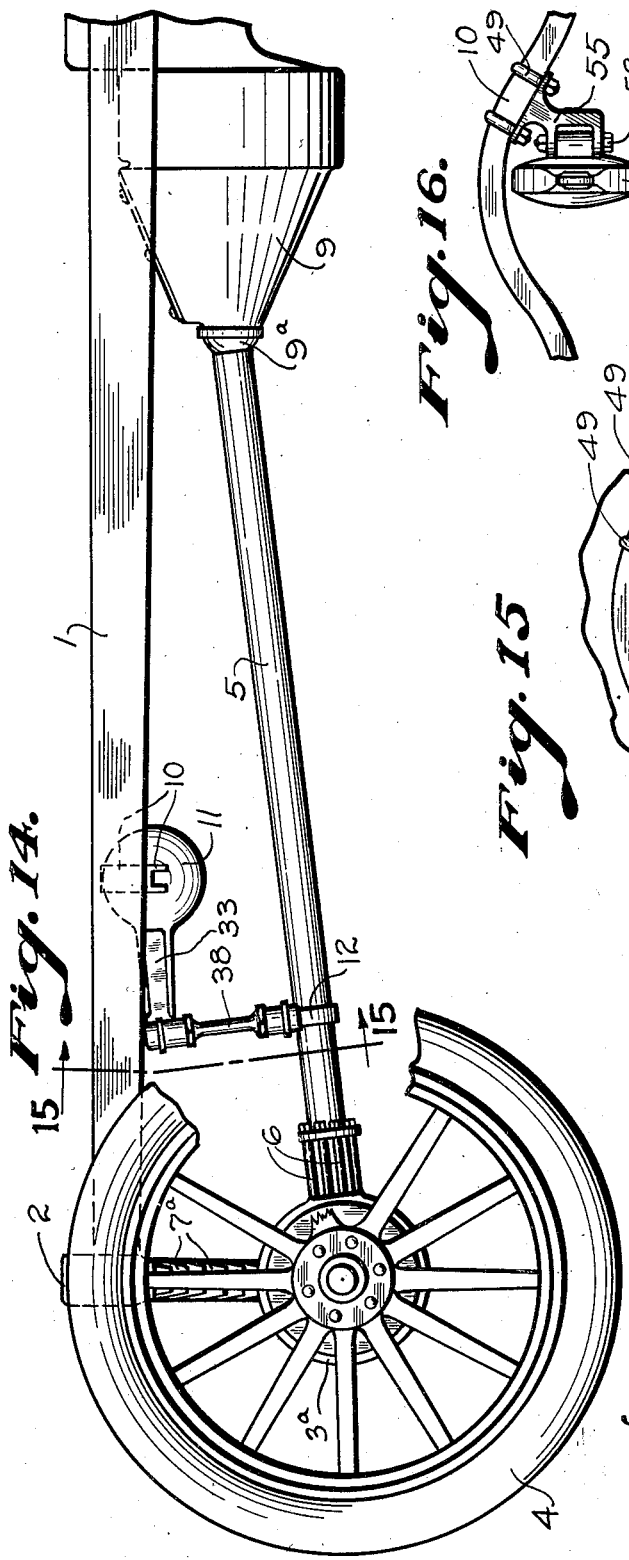
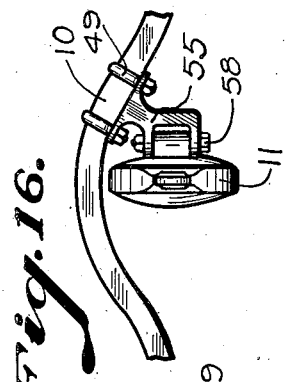
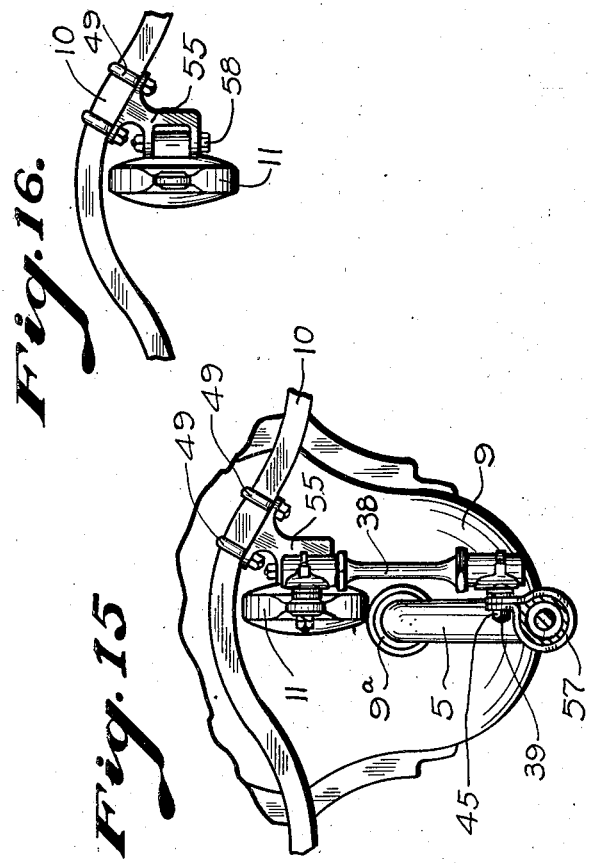
INVENTOR
Robert H. Hassler.
By Raymond F. Buckley
ATTORNEY Patented Nov. 27, 1923.

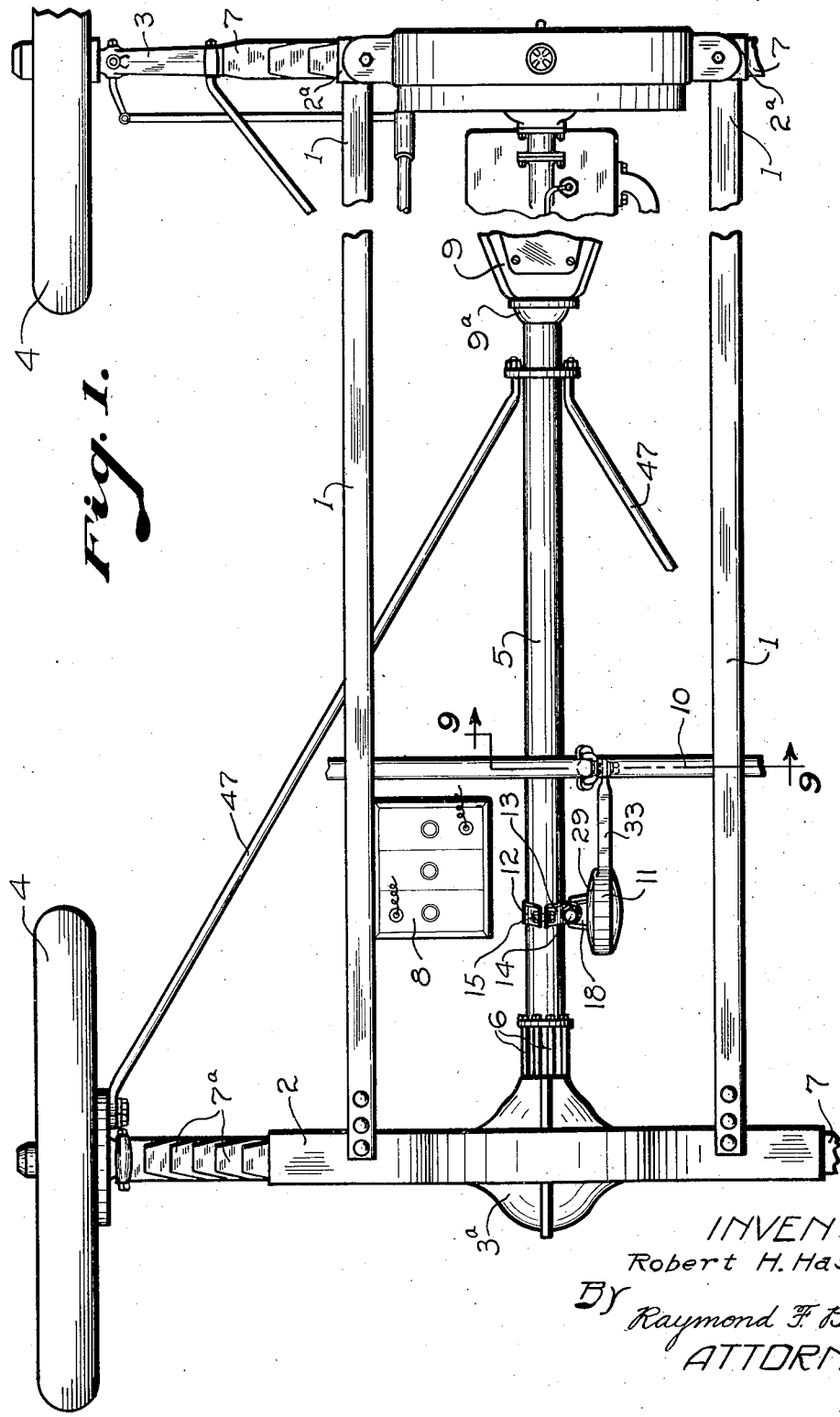

1,475,384

UNITED STATES PATENT OFFICE.

ROBERT H. HASSLER, OF INDIANAPOLIS, INDIANA.

VEHICLE SHOCK-ABSORBING SYSTEM.

Application filed July 3, 1923. Serial No. 649,379.

*To all whom it may concern:*

Be it known that I, ROBERT H. HASSLER, a citizen of the United States, residing at Indianapolis, in the county of Marion and State of Indiana, have invented certain new and useful Improvements in Vehicle Shock-Absorbing Systems, of which the following is a specification.

This invention relates to a system for damping or neutralizing the rebound of vehicle supporting springs, and has for its object the provision of a damping device for the chassis which will be effective in preventing excessive rebound movements of the spring suspended parts as a whole, without materially interfering with the free action of the springs of the vehicle in absorbing the minor vibrations or shocks by the passage of the wheels individually over uneven roadways.

Another object of the invention is to provide a shock absorbing system in which a few simple parts will dampen both the front and rear of the vehicle, and be reliable and positive in operation.

Still a further object is to provide a shock absorbing system having a single unit located in a central portion of the vehicle in such a peculiar manner that it exerts a greater damping effect on the rear of the vehicle where it is most needed, than on the front, and where the ratio between the damping effects on the rear and front is always the same independently of the particular adjustment of the shock absorbing device. In other words, whether the shock absorbing device is set to pull heavy or light, its relative effect on the rear and front will always be the same.

Still a further object is to provide a shock absorbing system adapted to be mounted on a vehicle having a comparatively high body and lightly constructed running gear, in such a way as to be almost invisible from the sides, front or rear of the car, and which therefore does not disfigure the appearance of the car, nor present any features of unsightliness.

Another object is to provide a shock absorbing system that does not interfere with the accessories with which automotive vehicles are usually equipped at both the front and rear ends, such as starting cranks, license tags, bumpers, spare tire attachments, tail lamps, rear signals and other necessary appurtenances.

All these and other advantages are accomplished by the use of a single shock absorbing unit mounted in the central part of the chassis, and preferably connected between the propeller shaft housing tube of the driving mechanism and one of the frame members as will be hereinafter described, in such a location as not to be immediately adjacent to any of the vehicle springs or wheels, nor immediately adjacent to either front or rear axle. In this way, I control the rebound of the spring suspended parts as a whole, and at the same time permit the free action of the springs when the wheels individually pass over uneven roadways.

The invention consists in certain peculiarities of the construction, novel arrangement and operation of the various parts thereof as will be hereinafter more fully set forth and specifically claimed.

In the accompanying drawings which serve to illustrate an embodiment of the invention—

Figure 1 is a fragmentary plan view of a conventional type of vehicle chassis, showing my invention applied thereto. Fig. 2 is a fragmentary side elevation of Fig. 1 showing the parts in normal load position. Fig. 3 is a cross sectional view taken approximately on line 3—3 in Fig. 2. Fig. 4 is an enlarged perspective view of the shock absorber bracket. Fig. 5 is an enlarged perspective view of the bracket clamp. Fig. 6 is a side elevation of Fig. 1, illustrating the parts in position of extreme compression. Fig. 7 is an enlarged cross section taken on line 7—7 in Fig. 6. Fig. 8 is a side elevation of Fig. 1 but showing the parts in a position of extreme rebound. Fig. 9 is a fragmentary sectional view taken on the line 9—9 in Fig. 1. Fig. 10 is an elevation of the connecting rod bracket. Fig. 11 is a plan view of the connecting rod bracket clip. Fig. 12 is an enlarged perspective view of the clamp plate. Fig. 13 is an enlarged sectional view of the shock absorber taken on the line 13—13 in Fig. 8. Fig. 14 is a side elevation of Fig. 1, but illustrating a modified form of my invention. Fig. 15 is a sectional view taken on the line 15—15 in Fig. 14. Fig. 16 is a fragmentary view of the modified form illustrating the manner in which the shock absorber is mounted on the chassis.

Referring to the drawings, 1 designates the vehicle frame, and 2 the rear cross member or rear spring saddle. 3 is the front axle, and 3ª is the rear axle. 4 designates the wheels, and 5 the drive shaft housing which is rigidly attached to the rear axle by means of a plurality of bolts 6. 7 is the front spring, and 7ª the rear spring, both of which are of the cross leaf type and mounted on the axles at their extreme ends. The central portion of the springs support the frame element through the medium of the saddle or cross member 2 and 2ª. 8 represents the usual automobile electrical storage battery which is located ordinarily adjacent to the drive shaft tube. 47—47 designates the rear axle radius rods which are attached at one end to the rear axle and at the opposite end to drive shaft housing. The drive shaft housing or tubing is connected at its forward end by means of a universal or swivel joint 9ª which is attached to the rear of transmission 9. The transmission is mounted rigidly into the frame 1 by means of the arms 9ᵇ, and when the rear wheels and axle vibrate, when running over rough roads, the drive shaft tubing is caused to oscillate. These oscillatory movements travel in an arc radiating from the swivel joint 9ª. 10 is the frame cross member which is secured intermediate its ends to the frame side members 1. I have mounted on the drive shaft tubing 5 a shock absorber 11, and for convenience of illustration, have employed a rotary disk friction type, the internal parts of which are more clearly illustrated in Fig. 13. 12 is the shock absorber mounting bracket which encircles the drive shaft tubing. 13 is the bracket clamp and is provided with an outwardly disposed ear 13ª which is conformed to match a similar ear 12ª on bracket 12. Each ear has similar apertures 12ᶜ and 13ᶜ respectively, through which a pivot bolt 14 passes, for the purpose of pivotally mounting the shock absorber on the drive shaft tubing so that a horizontal pivotal movement of the shock absorber is provided for installation adjustments. The bracket and clamp are further provided with vertically disposed ears 12ᵇ and 13ᵇ respectively which have located centrally therein apertures 12ᵈ and 13ᵈ. 15 is a clamp bolt which passes through the apertures 12ᵈ and 13ᵈ, and when drawn tightly in place, it securely fastens the bracket and shock absorber to the drive shaft tubing.

The shock absorber 11 is supported by means of a rigid non-rotating center support or hub member 18 which is provided with an aperture 18ª through which the clamp bolt 14 passes. The hub member 18 is further provided with a flange or disk portion 18ᵇ, from the outer periphery of which extend a plurality of out-turned lips or keys 18ᶜ. Into container 18ᵇ is pressed and securely held the friction disk 20 which is mounted non-rotatably in relation to its container 18ᵇ. 19 is a cylindrical bush which is pressed into the center opening of the hub member 18 forming a journal or bearing therein. 21 is a second disk container or flange having on its periphery a plurality of lips or keys 21ª. These keys engage loosely between keys 18ᶜ so that the two containers can move axially with relation to one another, but are locked circumferentially with reference to each other. 23 is a second friction disk and is securely pressed into container 21 and held so as to be non-rotatable therein. Interposed between container 18ª and 21 is an annular compression spring 25 which tends to press the two containers in a direction away from one another. 27 is an outer oscillating member or casing containing a central shaft 28 engaging in the bush 19 and forming a pivot bearing therein. 29 is a hollow cup shaped cover having external screw threads which tightly engage with internal screw threads in the oscillating member 27, thereby holding them in locking engagement with each other so that the two parts act in operation as a single member. 34 and 35 represent flat circular friction liners which are interposed between the wood disks 20 and 23 respectively. These liners are held so as to be non-rotatable in relation to the member 27 and cover 29 by means of circumferentially located ears 34ª and 35ª. The spring 25 sets up a central internal pressure against the friction liners which is transmitted through containers 18ᵇ and 21, and thereby dampens any oscillatory movements of the casing or housing members 27 and 29.

33 is an actuator arm formed integral with the oscillating member 27 and is operatively connected to the opposing vehicle member through any suitable mechanical connection which will set up oscillations when the frame and axle members of the vehicle approach or separate. The oscillatory movements are imparted to the actuator arm by means of connecting rod 38 which has similarly constructed attaching ends, a sectional view of one of the ends being clearly illustrated in Fig. 9. 39 is a ball stud which is held in place by means of an outer bearing socket 40 and an inner bearing socket 41. 42 is a helical compression spring which holds the bearing sockets in constant engagement with the ball 39, and is of sufficient compressive strength to actuate the lever 33 before yielding. The rod 38 is connected at its lower end to the lever 33 and at its upper end to a cross member attaching bracket 53. The connecting rod 38 is secured in place by means of the nuts 45—45. The attaching bracket 53 is so constructed as to fit into the channel section of the cross member 10, and is held securely in place by means of the clip 49, clamp plate 50, and the securing nuts 51.

The action of the shock absorber will, it is believed, be clear from the foregoing description. As the vehicle wheels pass over rough and uneven roads, the flexing of the spring suspended parts, cause the drive shaft tubing to oscillate radially in its universal joint and thereby change positions in relation to the frame element. This is more clearly illustrated in Figs. 2, 6 and 8 of the drawings. Such vibrations and radial movement of the drive shaft transmit through the connecting rod 38 oscillatory movements to actuator arm 33 which tends to dissipate all vibrations of the spring suspended parts.

Referring to Figs. 14 to 16 inclusive, in which the shock absorber is shown mounted on the cross member 10 of the frame element, 55 designates a shock absorber mounting bracket which is held in place on the cross member 10 by the clips 49 and nuts 51. 58 is a pivot bolt which secures the shock absorber in place. Connecting rod 38 is employed, in a similar manner to the preferred form, for connecting the actuator arm 33 to the opposed oscillating vehicle member. 57 is an attaching clamp which encircles the drive shaft housing and attaches to connecting rod 38 by means of the ball stud 39 and nut 45.

The operation of the modified construction illustrated in Figs. 14 to 16 inclusive, is similar to the preferred form, with the exception that the shock absorber is mounted rigidly on the cross member, and that the actuator arm 33 of the shock absorber operates concurrently with the drive shaft housing, instead of concurrently with the frame as illustrated in the preferred form.

To obtain the maximum riding comfort in automotive vehicles, resiliency or free movement of the springs must be maintained. Vehicles, when equipped with my single unit shock absorbing system, present a construction in which each of the four wheels is left free to pass independently over road obstructions with but little stiffening effect resulting. With some types of vehicle springs such road obstructions often transmit unpleasant vibrations to the occupants of the vehicle when the multiple unit system is employed. With the multiple unit system the nearness of the shock absorbers to the leaf springs tends to deprive the latter of their free range of travel.

When the vehicle wheel passes over major obstructions in the highways which cause the springs to compress, my single shock absorbing unit restrains the frame and body members from any violent upthrowing caused from the expansion or rebound movement of the springs.

My peculiar location and mounting of the shock absorber enables the single unit to transmit from its central location different degrees of damping action suited to the front and rear of the chassis,—and to transmit these proper relative amounts through the drive shaft housing tube and frame members. The drive shaft housing tube lies approximately on the longitudinal axis of the vehicle. It is rigidly connected at one end to the rear axle which is an unsuspended part, and is flexibly connected at its other end to a spring suspended part (the frame element) by means of a universal joint on the transmission element. This forms a very useful means for mounting the single unit shock absorbing device, and presents a construction which enables the single unit to transmit from its central position an ideal restraining and damping action to both the front and rear ends of the chassis.

I would state, in conclusion, that while the illustrated examples constitute practical embodiments of my invention, I do not limit myself strictly to the mechanical details herein illustrated, since manifestly the same can be considerably varied without departure from the spirit of the invention as defined in the appended claims.

Having thus described my invention, what I claim is:

1. In a vehicle having front and rear axles, a longitudinally extended drive-shaft housing and a frame resiliently supported on said axles, a shock absorbing system comprising a shock absorber having one of its relatively movable parts operatively connected to said housing and its other relatively movable part operatively connected to said frame at a point substantially central between the front and rear axles and substantially on the longitudinal axis of said frame, whereby oscillations of either end of said frame impart movement to said shock absorber.

2. In a vehicle having front and rear axles and a frame resiliently supported on said axles, a shock absorbing system comprising a shock absorber having its relatively movable parts operatively connected respectively to a substantially central point on one of said axles and to said frame at a point relatively central between said axles and substantially on the longitudinal axis of said frame, whereby oscillations of either end of said frame impart movement to said shock absorber.

3. In a vehicle having front and rear axles, a frame resiliently supported on said axles and a longitudinally extending axle-attached element, a shock absorbing system comprising a shock absorber having one of its relatively movable parts attached to said axle-attached element and its other relatively movable part attached to said frame at a point relatively central between said axles and substantially on the longitudinal axis of said frame, whereby oscillations of either end of said frame impart movement to said shock absorber.

4. In a vehicle having front and rear axles, a frame resiliently supported on said axles and a longitudinally extending drive-shaft housing, a shock absorbing system comprising a shock absorber having one of its relatively movable parts connected to said housing and its other relatively movable part connected to an intermediate part of said frame substantially on the longitudinal axis of said frame, said two points of connection being longitudinally spaced and the connecting point on said frame being offset from the vertical line of connection from said housing.

5. In a vehicle having front and rear axles, a frame element resiliently supported on said axles and a longitudinally extending axle-attached element, a shock absorbing system comprising a shock absorber mounted on one of said elements and having an actuator arm attached to the other of said elements, the attachment point on said frame element being relatively central between said axles and the attachment point on said axle-attached element, in an offset position therefrom.

6. In a vehicle having front and rear axles, a frame resiliently supported on said axles and a longitudinally extending drive-shaft housing, a shock absorbing system comprising a shock absorber having a fixed member and a projecting actuator member respectively attached to said frame and to said housing, the attachment point on said frame being relatively central between said axles and the attachment point on said housing, in an offset position therefrom.

7. In a vehicle having front and rear axles, a frame resiliently supported on said axles and a longitudinally extending drive-shaft housing, a shock absorbing system comprising a shock absorber having a fixed member and a projecting actuator member, said fixed member being mounted on said housing and said actuator member being attached to said frame at a point relatively central between said axles.

8. In a vehicle having front and rear axles, a frame resiliently supported on said axles and a longitudinally extending drive-shaft housing, a shock absorbing system comprising a shock absorber, which shock absorber is capable of damping frame movements in either direction and having a fixed member and a projecting actuator member, said fixed member being mounted on said housing and said actuator member being attached to said frame at a point relatively central between said axles.

9. In a vehicle having a spring suspended frame element, front and rear axle elements and a drive-shaft housing, a shock absorbing system comprising a shock absorber rigidly mounted on said housing element and operatively connected to said frame element substantially at a central point between the front and rear axles and substantially on the longitudinal axis of said frame whereby oscillations of either end of said frame impart movement to said shock absorbers.

10. In a vehicle having a spring suspended frame element, front and rear axle elements, an element extending from one of said axle elements and rigidly connected thereto, a shock absorbing system comprising a shock absorber supported by said extended element and operatively connected to said frame element substantially central intermediate the front and rear axles and substantially on the longitudinal axis of said frame.

11. In a vehicle having a spring suspended frame element, front and rear axle elements, an element extending from one of said elements and rigidly connected thereto, a shock absorbing system comprising a shock absorber rigidly mounted on said extended element and operatively connected to said opposing element substantially central intermediate the front and rear axles and substantially on the longitudinal axis of said frame whereby oscillations of either end of said frame impart movement to said shock absorber.

12. In a vehicle having a spring suspended frame element, front and rear axle elements, an element extending from one of said axle elements and rigidly connected thereto, a shock absorbing system comprising a shock absorber which is capable of damping frame movements in either direction and rigidly mounted on said axle extended element and operatively connected to said frame element substantially central intermediate the front and rear axles and substantially on the longitudinal axis of said frame whereby oscillations of either end of said frame impart movement to said shock absorber.

In witness whereof, I have hereunto set my hand and seal at Indianapolis, Indiana, this 26th day of June, A. D., one thousand nine hundred and twenty-three.

ROBERT H. HASSLER. [L. S.]